(12) United States Patent
Moser et al.

(10) Patent No.: US 8,453,489 B2
(45) Date of Patent: Jun. 4, 2013

(54) METHOD AND SYSTEM FOR CONDUCTING CRASH TESTS

(75) Inventors: Andreas Moser, Linz (AT); Manfred Hofinger, Buchkirchen (AT); Gundula Steffan, Linz (AT)

(73) Assignee: Illinois Tool Works Inc., Glenview, IL (US)

( * ) Notice: Subject to any disclaimer, the term of this patent is extended or adjusted under 35 U.S.C. 154(b) by 213 days.

(21) Appl. No.: 12/530,837

(22) PCT Filed: Feb. 29, 2008

(86) PCT No.: PCT/US2008/002693
§ 371 (c)(1),
(2), (4) Date: Mar. 19, 2010

(87) PCT Pub. No.: WO2008/115343
PCT Pub. Date: Sep. 25, 2008

(65) Prior Publication Data
US 2010/0192666 A1  Aug. 5, 2010

(30) Foreign Application Priority Data
Mar. 15, 2007 (DE) .................. 10 2007 012 492

(51) Int. Cl.
*G01M 7/00* (2006.01)
(52) U.S. Cl.
USPC ........................................... 73/12.04
(58) Field of Classification Search
USPC .................. 73/12.01, 12.04, 12.07
See application file for complete search history.

(56) References Cited

U.S. PATENT DOCUMENTS

| | | | | |
|---|---|---|---|---|
| 4,399,887 A * | 8/1983 | Okada | ........................... | 180/282 |
| 4,930,355 A * | 6/1990 | Heck | ............................... | 73/840 |
| 5,338,206 A | 8/1994 | Hupfer | | |
| 5,635,624 A | 6/1997 | Cerny | | |
| 5,652,375 A * | 7/1997 | Da Re' | ........................ | 73/12.04 |

(Continued)

FOREIGN PATENT DOCUMENTS

| | | |
|---|---|---|
| EP | 1750112 | 2/2007 |
| JP | 6-114524 A | 4/1994 |

(Continued)

OTHER PUBLICATIONS

"Extension of the Honda-DRI "Safety Impact Methodology" (SIM) for the NHTSA Advanced Crash Avoidance Technology (ACAT) Program and Application to a Prototype Advanced Collision Mitigation Braking System"; John W. Zellner, R. Michael Van Auken, Dean P. Chiang, Peter C. Broen, Joseph Kelly and Yoichi Sugimoto; SEA International Technical Papers, DOI 10.4271/2009-01-0781; Apr. 20, 2009.

*Primary Examiner* — Max Noori
(74) *Attorney, Agent, or Firm* — McCarter & English, LLP

(57) ABSTRACT

The invention relates to a method for conducting crash tests in which an object, in particular a motor vehicle or part of a motor vehicle, is typically mounted on a test slide which is accelerated, the acceleration force being generated by means of a pressurized-gas reservoir and specifically applied to the acceleration object via a piston and a push rod, while for reducing the cycle times, the desired gas pressure in the pressurized-gas reservoir is generated by moving a piston, itself exposed to a hydraulic fluid, so as to apply pressure on the gas. The invention also relates to a correspondingly implemented system.

5 Claims, 1 Drawing Sheet

U.S. PATENT DOCUMENTS

| Patent No. | | Date | Inventor | Class |
|---|---|---|---|---|
| 5,694,320 | A | 12/1997 | Breed | |
| 5,783,739 | A | 7/1998 | Miller | |
| 5,872,321 | A * | 2/1999 | Yannaccone | 73/865.3 |
| 5,929,348 | A * | 7/1999 | Stein et al. | 73/865.3 |
| 6,023,984 | A | 2/2000 | Mazur et al. | |
| 6,675,631 | B1 * | 1/2004 | Steffan et al. | 73/12.04 |
| 6,691,585 | B2 | 2/2004 | Ahn | |
| 7,103,704 | B2 | 9/2006 | Chatterjee | |
| 7,543,475 | B2 | 6/2009 | Rieser et al. | |
| 7,575,491 | B1 | 8/2009 | Martin | |
| 7,617,048 | B2 | 11/2009 | Simon et al. | |
| 2002/0026820 | A1 | 3/2002 | Potts | |
| 2004/0230394 | A1 | 11/2004 | Saari et al. | |
| 2005/0081656 | A1 | 4/2005 | Saari et al. | |
| 2008/0011047 | A1 | 1/2008 | Dragan | |
| 2010/0109835 | A1 | 5/2010 | Alrabady et al. | |

FOREIGN PATENT DOCUMENTS

| Country | Number | Date |
|---|---|---|
| JP | 2521392 | 8/1996 |
| JP | 9280202 | 10/1997 |
| JP | 10141086 | 5/1998 |
| JP | 2766794 | 6/1998 |
| JP | 2955178 | 10/1999 |
| JP | 2980711 | 11/1999 |
| JP | 2003-502658 A | 1/2003 |
| JP | 2003239538 | 8/2003 |
| JP | 3676695 | 7/2005 |
| JP | 3676696 | 7/2005 |
| JP | 3676697 | 7/2005 |
| JP | 3930125 | 6/2007 |

* cited by examiner

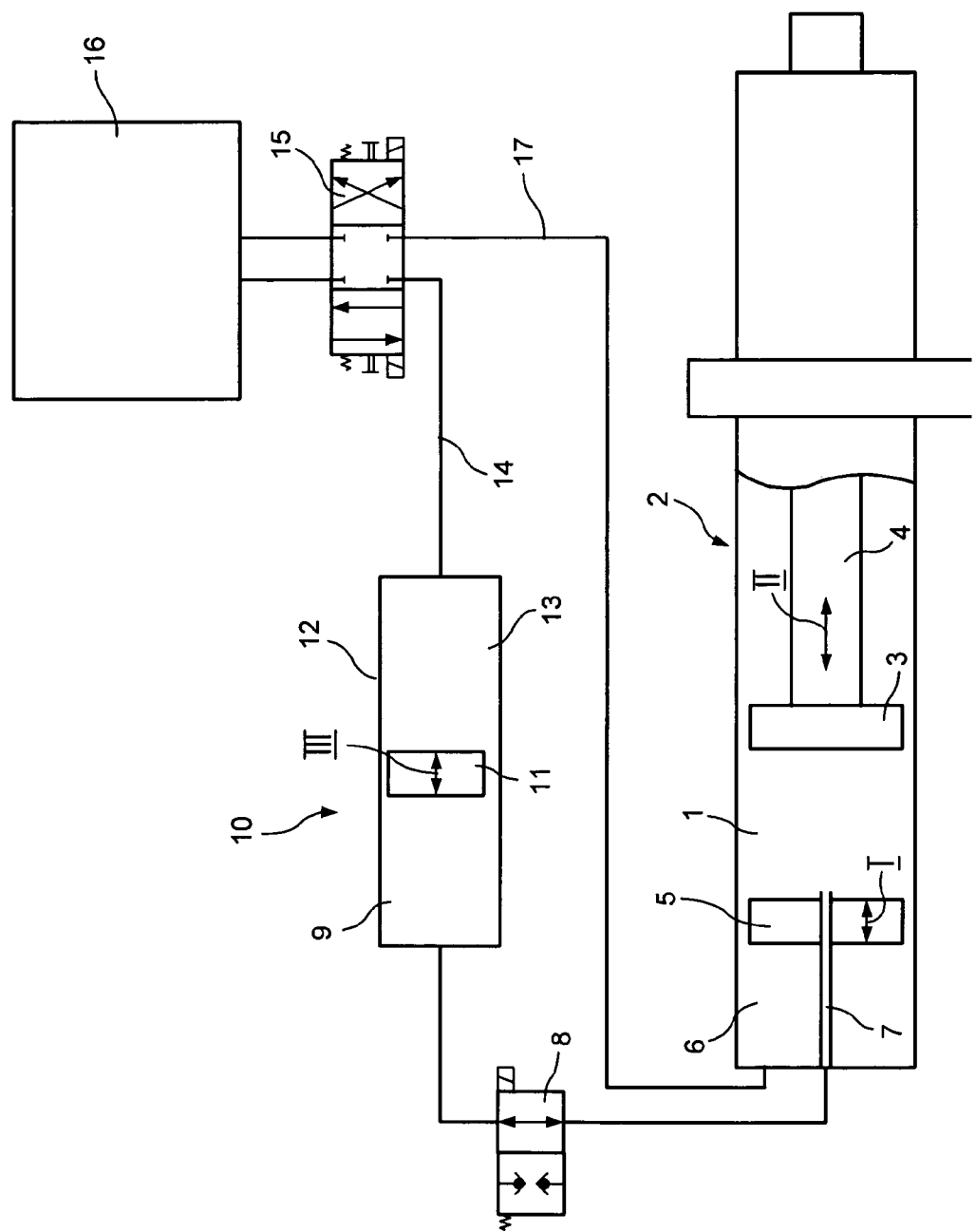

METHOD AND SYSTEM FOR CONDUCTING CRASH TESTS

This invention relates to a method for conducting crash tests in which an object, in particular a motor vehicle or part of a motor vehicle, is typically mounted on a test slide which is accelerated, the acceleration force being generated by means of a pressurized-gas reservoir and specifically applied to the acceleration object via a piston and a push rod.

The invention also relates to a system for conducting crash tests in which an object, in particular a motor vehicle or part of a motor vehicle, is typically mounted on a test slide which is accelerated, the acceleration force being generated by means of a pressurized-gas reservoir and specifically applied to the acceleration object via a piston and a push rod.

A method and a system of the type referred to have been described earlier for instance in WO 00/79236 A1. According to that earlier method, the inertial deceleration in a real crash test is simulated by accelerating the test object. This means that the acceleration forces acting on the moving mass of the vehicle upon its collision with an obstacle are directly applied by accelerating the test slide against the test object. It is thus possible to arrive at a very good replication of real-world deceleration curves. The test object is not destroyed. However, this invention can also be employed in conventional crash tests in which the object is accelerated to a specific speed and is caused to collide with an obstacle at that speed, as well as in crash tests involving only parts of a motor vehicle, as described for instance in EP 1 750 112 A1.

In these earlier methods and systems the necessary gas pressure is generated in the pressurized-gas reservoir by means of a compressor. It takes a relatively long time to fill the pressurized-gas reservoir, which in turn results in relatively long delays between crash test cycles.

It is therefore the objective of this invention to introduce a method and a system of the type referred to above by means of which the cycle times can be shortened.

This objective is achieved by a method of the type mentioned above in that the desired gas pressure is generated in the pressurized-gas reservoir by applying a hydraulic fluid to the piston, whereby the piston is moved and on its part applies pressure on the gas.

In addition, the stated objective is achieved with a system of the type mentioned above, in that it incorporates a piston-and-cylinder assembly in which the piston divides the cylinder into a first piston chamber that contains the pressurized gas and a second piston chamber that accepts the hydraulic fluid, which second piston chamber can be filled with hydraulic fluid for moving the piston.

Generating the necessary gas pressure by means of a hydraulically operated piston can significantly shorten the cycle times. The hydraulic fluid is supplied by an appropriate hydraulic pump, thus considerably reducing the time it takes to fill the pressurized-gas reservoir. Depending on the hydraulic pump employed, cycle times of less than 15 minutes can be achieved.

The gas supply is preferably provided in a separate piston chamber with the gas contained on one side and the hydraulic fluid on the other side of the piston. Advantageously, this can be accomplished using a commercially available hydraulic piston-type accumulator, which will reduce the cost of the system.

In a particularly preferred configuration of the invention, the gas is fed back into the gas reservoir, i.e. the piston-type accumulator, upon completion of the crash test. The advantageous result is a closed gas feedback loop, eliminating the traditional noise problem inherent in the venting of compressed air. Moreover, the problem of temperature changes caused by the expansion and compression of the gas is reduced considerably, permitting a more precise filling of the pressurized-gas reservoir in terms of the pressure applied.

The gas recirculation is preferably implemented by means of an additional piston provided in the pressurized-gas reservoir and again driven by a hydraulic fluid. Preferably, that hydraulic fluid is moved by the same hydraulic pump that delivers the hydraulic fluid for pressurizing the gas. This greatly simplifies the gas recirculation back into the gas reservoir.

To permit a variation of the amount of gas with which the pressurized-gas reservoir is filled, and thus a variation of the gas pressure, a preferred approach is to provide a hydraulic-fluid reservoir from which the second piston chamber of the piston-and-cylinder assembly can be filled as needed.

Upon completion of the crash test, the additional piston in the pressurized-gas cylinder is on its part returned to its home position by the retraction of the push rod, which again constitutes a particularly simple solution.

The gas predominantly employed is nitrogen, which is desirable from the perspective of its expansion and compression characteristics as well as reduced corrosion hazards.

The method according to the invention lends itself particularly well to crash tests in which the inertial forces encountered in a real collision are merely simulated, and especially in a process in which the acceleration force generated by the gas pressure is greater than the force actually needed, with a braking device serving to produce the desired acceleration curve.

All of the above method-related statements apply correspondingly to the system according to this invention.

One implementation example of the invention is depicted in the attached drawing and described below. As the sole illustration, FIG. 1 shows in schematic fashion a system according to the invention, serving to generate the gas pressure in a pressurized-gas reservoir for use in a crash test.

The system illustrated encompasses a gas pressure chamber 1 in the form of a cylinder 2 containing a movable piston 3. The piston 3 is rigidly connected to a push rod 4 that protrudes from one end of the cylinder 2 and serves to operate a crash test slide.

Also movably contained in the cylinder 2 is a second piston 5. It is positioned opposite the first piston 3 on the side facing away from the push rod 4 and forms with the piston 3 the gas pressure chamber 1 and, on its other side within the cylinder 2, an additional piston chamber 6.

By way of conduit 7 extending through the second piston 5 and via a directional control valve 8, the gas pressure chamber 1 connects to a first piston chamber 9 of a separate piston-and-cylinder assembly 10. Typically by electromagnetic means, the directional control valve 8 can be set to close or, as illustrated, to open the conduit 7. The piston-and-cylinder assembly 10 includes a piston 11 that moves within a cylinder 12 and subdivides the latter into a first piston chamber 9 and a second piston chamber 13. By way of a conduit 14 and another directional control valve 15, the second piston chamber 13 connects to a hydraulic unit 16 that encompasses a hydraulic pump and a hydraulic-fluid reservoir. By way of the directional control valve 15 and a hydraulic feeder line 17, the hydraulic unit 16 also connects to the second piston chamber 6 of the pressurized-gas reservoir 2.

The directional control valve 15 has three settings which, apart from the position illustrated, includes a setting in which the hydraulic pump of the hydraulic unit 16 pumps hydraulic fluid into the second piston chamber 13 of the piston-and cylinder assembly 10, while fluid from the second piston chamber 6 of the pressurized-gas reservoir 2 can flow back into the hydraulic unit 16 via the conduit 17, as well as a third setting in which the hydraulic pump of the hydraulic unit 16 pumps fluid into the second piston chamber 6 of the pressurized-gas reservoir 2 while fluid from the second piston chamber 13 of the piston-and-cylinder assembly 10 can flow back into the hydraulic-fluid reservoir of the hydraulic unit 16. Preferably, the second directional control valve 15 as well is operated by electromagnetic means.

To initiate a crash test using the system according to the invention, the directional control valve 8 is set in its open position and the directional control valve 15 is set to connect the hydraulic pump of the hydraulic unit 16 to the piston chamber 13 of the piston-and-cylinder assembly 10. Activating the hydraulic pump of the hydraulic unit 16 will pump fluid into the piston chamber 13. The piston 11 thereby moves to the left as indicated by the two-way arrow III, forcing the gas present in the piston chamber 9 through the directional control valve 8 and via the piston 5 into the gas pressure chamber 1. This process is continued until the desired gas pressure is reached in the gas pressure chamber 1. A braking device, not illustrated, holds the piston 3 with the push rod 4 in its position while, as indicated by the two-way arrow I, the piston 5 can move into its final position if it is not already there. Once the desired pressure has been established, the two directional control valves 8 and 15 are closed, allowing the pressure to be maintained without operating the hydraulic pump. The crash test can now take place in that the braking device, not illustrated, is released. This moves the push rod 4, driven by the piston 3, to the right and out of the pressurized-gas reservoir 2 as indicated by the two-way arrow II, propelling the test object in the desired fashion. Specifically, the braking device is operated in a manner whereby the test object is accelerated along a realistic inertial curve.

Upon completion of the crash test, the directional control valve 8 is reopened and the directional control valve 15 is switched to its second open setting which connects the hydraulic pump of the hydraulic unit 16 to the second piston chamber 6 of the pressurized-gas reservoir 2 and the hydraulic-fluid reservoir connects to the second piston chamber 13 of the piston-and-cylinder assembly 10. Activating the hydraulic pump will pump hydraulic fluid into the piston chamber 6, moving the piston 5 to the right as indicated by the two-way arrow I. As a result, the pressurized gas, i.e. the nitrogen, present between the piston 5 and the piston 3, will be recirculated through the conduit 7 and through the directional control valve 8 back into the gas-pressure i.e. piston chamber 9. That in turn will move the piston 11 to the right as indicated by the two-way arrow III, pushing the fluid out of the piston chamber 13 through the conduit 14 and the directional control valve 15 back into the hydraulic-fluid reservoir of the hydraulic unit 16. As soon as the piston 5 makes contact with the piston 3, all of the pressurized gas will be back in the gas-pressure i.e. piston chamber 9. As indicated by the two-way arrow II, the push rod 4 will move to the left and return to its home position, concurrently causing the piston 5 to move to the left as indicated by the two-way arrow I in the direction of its own home position. The gas pressure chamber 1 can now be reloaded as described above, while the push rod 4 is once again held in place by the braking device and the gas pressure building up in the gas pressure chamber 1 moves the piston 5 to the left into its final position. In the process, and as the piston 5 is moved by the push rod 4, the fluid present in the piston chamber 6 is returned to the hydraulic-fluid reservoir of the hydraulic unit 16 via the conduit 17 and the directional control valve 15.

List of Reference Numbers 1 gas pressure chamber
2 pressurized-gas reservoir
3 piston
4 push rod
5 piston
6 piston chamber
7 conduit
8 directional control valve
9 piston chamber
10 piston-and-cylinder assembly
11 piston
12 cylinder
13 piston chamber
14 conduit
15 directional control valve
16 hydraulic unit
17 conduit
I two-way arrow
II two-way arrow
III two-way arrow

The invention claimed is:

1. Method for conducting crash tests in which an object, in particular a motor vehicle or part of a motor vehicle, is mounted on a test slide which is accelerated, the acceleration force being generated by means of a reservoir (2) and applied to the acceleration object via a working piston (3) and a push rod (4),
characterized in that,
  a desired gas pressure in a gas chamber (1) of the reservoir (2) is generated by the movement of a charging piston (11) exposed to the pressure of a hydraulic fluid in a charging cylinder (10);
  wherein gas is stored in a gas chamber (9) separated by the charging piston (11) from hydraulic fluid in charging an oil chamber (13) of the charging cylinder (10) and wherein application of hydraulic fluid pressure to the oil chamber (13) of the charging cylinder (10) causes gas pressure to build to desired level in the gas chamber (1);
  wherein upon completion of the crash test the gas is returned to the gas chamber (9) by applying hydraulic oil pressure in an oil chamber (6) of the reservoir (2) and wherein hydraulic pressure is released in charging the oil chamber (13) of the charging cylinder (10) to a hydraulic pump reservoir (16) and hydraulic pressure is applied in the oil chamber (6) of the reservoir (2) thereby displacing a moving piston (5) and evacuating gas via a discharge pipe (7) into gas chamber (9) whereby substantially all of the gas is evacuated to the charging cylinder (10) when the moving piston (5) reaches the first piston (3); and
  wherein remaining hydraulic fluid in the oil chamber (6) of the reservoir (2) is forced back to the pump reservoir (16) when gas pressure is charged for the next test, gas is recirculated in a closed feedback loop and remaining gas pressure in the gas chamber (1) is recovered after the test is complete.

2. The method of claim 1 wherein the hydraulic fluid is applied by a hydraulic pump.

3. The method of claim 2 wherein the discharge pipe (7) is a tube assembly which allows free motion of the moving piston (5).

4. The method of claim 3 wherein gas is isolated in gas chamber (9) by closing valve (8), hydraulic fluid pressure is released from oil chamber (6) by valve (15) and push rod (4) is retracted to a position ready for a test.

5. The method of claim 4 wherein the hydraulic fluid is recirculated in a closed feedback loop.

* * * * *